(12) United States Patent
Bin

(10) Patent No.: US 11,498,676 B2
(45) Date of Patent: Nov. 15, 2022

(54) METHOD AND APPARATUS FOR CONTROLLING FLIGHT OF UNMANNED AERIAL VEHICLE

(71) Applicant: Guangzhou Xaircraft Technology Co., LTD., Guangdong (CN)

(72) Inventor: Wu Bin, Guangdong (CN)

(73) Assignee: Guangzhou Xaircraft Technology Co., LTD., Guangdong (CN)

( * ) Notice: Subject to any disclaimer, the term of this patent is extended or adjusted under 35 U.S.C. 154(b) by 246 days.

(21) Appl. No.: 16/462,847

(22) PCT Filed: Nov. 24, 2017

(86) PCT No.: PCT/CN2017/112862
§ 371 (c)(1),
(2) Date: May 21, 2019

(87) PCT Pub. No.: WO2018/095407
PCT Pub. Date: May 31, 2018

(65) Prior Publication Data
US 2020/0062394 A1 Feb. 27, 2020

(30) Foreign Application Priority Data

Nov. 28, 2016 (CN) .......................... 201611070426.X

(51) Int. Cl.
*B64C 39/02* (2006.01)
*G01C 23/00* (2006.01)
(Continued)

(52) U.S. Cl.
CPC ............ *B64C 39/024* (2013.01); *G01C 23/00* (2013.01); *G05D 1/0016* (2013.01); *G05D 1/101* (2013.01);
(Continued)

(58) Field of Classification Search
CPC . B64C 39/024; B64C 2201/146; B64C 13/00; G05D 1/0011; G05D 1/0016;
(Continued)

(56) References Cited

U.S. PATENT DOCUMENTS 8,606,440 B2 12/2013 Solheim
2009/0204276 A1 8/2009 Stuckman et al.
(Continued)

FOREIGN PATENT DOCUMENTS

CN 104670496 A 6/2015
CN 104932526 A 9/2015
(Continued)

OTHER PUBLICATIONS

International Search Report issued in connection with PCT/CN2017/112862 dated Feb. 27, 2018.
(Continued)

*Primary Examiner* — Behrang Badii
(74) *Attorney, Agent, or Firm* — Dennemeyer & Associates; Victoria Friedman

(57) ABSTRACT

A method and apparatus for controlling the flight of an Unmanned Aerial Vehicle (UAV) are provided. The method includes: determining a starting flight position where a UAV is parked currently and a nose direction of the UAV (101); starting off from the starting flight position, and flying along a straight line in the nose direction (102); and when receiving a route adjustment instruction during the flight of the UAV, adjusting an air route of the UAV according to the route adjustment instruction (103). During the flight, an operator can correct an air route via a remote control apparatus without surveying and mapping when detecting that the UAV is flying off course; and the operator can make the UAV precisely fly along a desired straight line by means of simple operations.

12 Claims, 3 Drawing Sheets

A UAV determines a starting flight position where the UAV is parked currently and a nose direction of the UAV — 101

The UAV starts off from the starting flight position, and flies along a straight line in the nose direction — 102

When receiving a route adjustment instruction during the flight of the UAV, the UAV adjusts an air route of the UAV according to the route adjustment instruction — 103

(51) Int. Cl.
  *G05D 1/00* (2006.01)
  *G05D 1/10* (2006.01)
  *G06F 3/04847* (2022.01)

(52) U.S. Cl.
  CPC .... *G06F 3/04847* (2013.01); *B64C 2201/146* (2013.01)

(58) Field of Classification Search
  CPC ...... G05D 1/101; G05D 1/12; G06F 3/04847; G01C 23/00
  See application file for complete search history.

(56) References Cited

U.S. PATENT DOCUMENTS

| | | | | |
|---|---|---|---|---|
| 2009/0306840 | A1* | 12/2009 | Blenkhorn | G05D 1/0676 701/16 |
| 2012/0239232 | A1 | 9/2012 | Solheim | |
| 2016/0202695 | A1* | 7/2016 | Deroos | G08G 5/0086 701/2 |
| 2016/0306351 | A1* | 10/2016 | Fisher | G05D 1/0044 |
| 2017/0186329 | A1* | 6/2017 | Gao | G08G 5/0082 |
| 2017/0229022 | A1* | 8/2017 | Gurel | G06T 5/002 |
| 2017/0315545 | A1* | 11/2017 | Li | B64C 39/024 |
| 2017/0337824 | A1* | 11/2017 | Chen | G08G 5/0086 |
| 2017/0355457 | A1* | 12/2017 | Terry | G08G 5/0034 |
| 2019/0011921 | A1* | 1/2019 | Wang | H04N 5/23299 |
| 2019/0295427 | A1* | 9/2019 | Priest | G08G 5/0008 |

FOREIGN PATENT DOCUMENTS

| | | |
|---|---|---|
| CN | 105022398 A | 11/2015 |
| CN | 105045281 A | 11/2015 |
| CN | 105302158 A | 2/2016 |
| CN | 105867407 A | 8/2016 |
| CN | 105867424 A | 8/2016 |
| CN | 106444848 A | 2/2017 |
| JP | 2014040231 A | 3/2014 |
| JP | 2016041555 A | 3/2016 |
| WO | 2016027544 A1 | 2/2016 |

OTHER PUBLICATIONS

Written Opinion in connection with PCT/CN2017/112862 dated Feb. 27, 2018.
China Search Report in connection to Application No. CN201611070426A filed on Nov. 28, 2016.
European Search Report issued in connection to PCT/CN2017/112862 dated May 19, 2020.

* cited by examiner

METHOD AND APPARATUS FOR CONTROLLING FLIGHT OF UNMANNED AERIAL VEHICLE

TECHNICAL FIELD

The present disclosure relates to the technical field of unmanned aerial vehicles, and in particular to a method for controlling the flight of an unmanned aerial vehicle and an apparatus for controlling the flight of an unmanned aerial vehicle.

BACKGROUND

An Unmanned Aerial Vehicle (UAV) is an unmanned aircraft operated by a radio remote control device and a self-contained program control apparatus. UAVs are widely used in plant protection, urban management, geology, meteorology, electric power, disaster relief, video shooting and other industries.

With the development of a UAV plant protection technology, UAV plant protection has characteristics of small damage to crops and high utilization rate of pesticides. More and more peasant households or farmers use UAVs for plant protection operations; especially use UAVs for pesticide spraying and fertilizer spraying.

In the related art, when a UAV is in the plant protection operation, the following two manners may be used to control a flight route: one manner is to manually control the attitude or flight speed of the UAV to control the UAV to fly along a corresponding trajectory, and the other manner is to upload or set a route on a ground end, so that the UAV automatically performs the corresponding route to achieve the task of the operation.

The first manner mentioned above can be flexibly controlled manually in small plot operations, but requires an operator to participate in the whole process to correct the flight of the UAV with human perception. It is easy to make the UAV deviate from the flight route when performing a slightly larger plot task.

In the second manner mentioned above, the operation is accurate and does not require people to participate, but it needs to be surveyed in advance, the surveying and mapping requirements are high, and the existing technology cannot be real-time strained in the case of actual operation changes.

SUMMARY

At least some embodiments of the present disclosure provide a method for controlling the flight of a UAV and an apparatus for controlling the flight of a UAV, so as to overcome the above problem or so as at least partially to solve the above problem.

To solve the above problem, in an embodiment of the present disclosure, a method for controlling the flight of a UAV is provided. The method includes that: determining a starting flight position where a UAV is parked currently and a nose direction of the UAV; starting off from the starting flight position, and flying along a straight line in the nose direction; and when receiving a route adjustment instruction during the flight of the UAV, adjusting an air route of the UAV according to the route adjustment instruction.

In an optional embodiment, before the step of determining the starting flight position where the UAV is parked currently and the nose direction of the UAV, the method further includes: receiving a flight speed parameter and a flight distance parameter.

In an optional embodiment, the step of starting off from the starting flight position and flying along the straight line in the nose direction includes: starting off from the starting flight position, and flying along the straight line at a speed specified by the flight speed parameter in the nose direction.

In an optional embodiment, the route adjustment instruction is an instruction sent by a remote control apparatus, and generating, by the remote control apparatus, the route adjustment instruction in the following manners: detecting an air route adjustment operation performed by an operator in the remote control apparatus; determining at least one of an air route adjustment direction and an air route adjustment margin corresponding to the air route adjustment operation; and generating the route adjustment instruction according to at least one of the air route adjustment direction and the air route adjustment margin.

In an optional embodiment, the air route adjustment operation includes at least one of the following operations: a sliding operation of the operator on a touch screen slider in the remote control apparatus; a clicking operation of the operator on a physical direction button in the remote control apparatus; a moving operation of the operator on a control rocker in the remote control apparatus; and a touch operation of the operator on a touch screen direction button in the remote control apparatus.

In an optional embodiment, the step of when receiving the route adjustment instruction during the flight of the UAV, adjusting the air route of the UAV according to the route adjustment instruction includes: when receiving the route adjustment instruction during the flight of the UAV, operating the UAV to fly to a reference point according to the air route adjustment direction and the air route adjustment margin; acquiring coordinates of the reference point; determining coordinates of a target point according to a direction angle and the flight distance parameter, and the direction angle is determined by the starting flight position and the coordinates of the reference point; acquiring a real-time course angle of the UAV; calculating an air route deviation according to the direction angle and the course angle; controlling the UAV to align with the target point according to the air route deviation; and calculating a distance between the reference point and the target point, and controlling the UAV to fly to the target point.

In an optional embodiment, the step of when receiving the route adjustment instruction during the flight of the UAV, adjusting the air route of the UAV according to the route adjustment instruction includes: when receiving the route adjustment instruction during the flight of the UAV, operating the UAV to fly to a reference point according to the air route adjustment direction and the air route adjustment margin; acquiring coordinates of the reference point; acquiring a real-time course angle of the UAV; calculating an air route deviation according to a direction angle and the course angle, and the direction angle is determined by the starting flight position and the coordinates of the reference point; controlling the UAV to align with a direction indicated by the direction angle according to the air route deviation; calculating a distance between the starting flight position and the reference point; and controlling the flight of the UAV according to a remaining distance, and the remaining distance is determined by the flight distance parameter and the distance between the starting flight position and the reference point.

In another embodiment of the present disclosure, an apparatus for controlling the flight of a UAV is further provided. The apparatus includes:

an information determination component, configured to determine a starting flight position where a UAV is parked currently and a nose direction of the UAV; a flight component, configured to start off from the starting flight position, and fly along a straight line in the nose direction; and a direction adjustment component, configured to adjust, when receiving a route adjustment instruction during the flight of the UAV, an air route of the UAV according to the route adjustment instruction.

In an optional embodiment, the apparatus further includes: a parameter receiving component, configured to receive a flight speed parameter and a flight distance parameter.

In an optional embodiment, the flight component is further configured to: start off from the starting flight position, and fly along the straight line at a speed specified by the flight speed parameter in the nose direction.

In an optional embodiment, the route adjustment instruction is an instruction sent by a remote control apparatus, and generating, by the remote control apparatus, the route adjustment instruction in the following manners: detecting an air route adjustment operation performed by an operator in the remote control apparatus; determining at least one of an air route adjustment direction and an air route adjustment margin corresponding to the air route adjustment operation; and generating the route adjustment instruction according to at least one of the air route adjustment direction and the air route adjustment margin.

In an optional embodiment, the air route adjustment operation includes at least one of the following operations: a sliding operation of the operator on a touch screen slider in the remote control apparatus; a clicking operation of the operator on a physical direction button in the remote control apparatus; a moving operation of the operator on a control rocker in the remote control apparatus; and a touch operation of the operator on a touch screen direction button in the remote control apparatus.

In an optional embodiment, the direction adjustment component includes: a first reference point flight sub-component, configured to operate, when receiving the route adjustment instruction during the flight of the UAV, the UAV to fly to a reference point according to the air route adjustment direction and the air route adjustment margin; a first reference point coordinate acquisition sub-component, configured to acquire coordinates of the reference point; a target point coordinate determination sub-component, configured to determine coordinates of a target point according to a direction angle and the flight distance parameter, and the direction angle is determined by the starting flight position and the coordinates of the reference point; a first real-time course angle acquisition sub-component, configured to acquire a real-time course angle of the UAV; a first air route deviation calculation sub-component, configured to calculate an air route deviation according to the direction angle and the course angle; a first direction alignment sub-component, configured to control the UAV to align with the target point according to the air route deviation; and a first flight control sub-component, configured to calculate a distance between the reference point and the target point, and controlling the UAV to fly to the target point.

In an optional embodiment, the direction adjustment component includes: a second reference point flight sub-component, configured to operate, when receiving the route adjustment instruction during the flight of the UAV, the UAV to fly to a reference point according to the air route adjustment direction and the air route adjustment margin; a second reference point coordinate acquisition sub-component, configured to acquire coordinates of the reference point; a second real-time course angle acquisition sub-component, configured to acquire a real-time course angle of the UAV; a second air route deviation calculation sub-component, configured to calculate an air route deviation according to a direction angle and the course angle, and the direction angle is determined by the starting flight position and the coordinates of the reference point; a second direction alignment sub-component, configured to control the UAV to align with a direction indicated by the direction angle according to the air route deviation; a distance calculation sub-component, configured to calculate a distance between the starting flight position and the reference point; and a second flight control sub-component, configured to control the flight of the UAV according to a remaining distance, and the remaining distance is determined by the flight distance parameter and the distance between the starting flight position and the reference point.

At least some embodiments of the present disclosure include the following advantages:

When the UAV determines the starting flight position and the nose direction of the UAV, the UAV may directly start from the starting flight position and fly along the straight line in the nose direction. When receiving a route adjustment instruction during the flight of the UAV, an air route of the UAV can be adjusted according to the route adjustment instruction. At least some embodiments of the present disclosure make the UAV fly along a straight line required by an operator in combination with manual fine adjustment modification and automatic navigation of the UAV; during the flight, the operator can correct an air route via a remote control apparatus without surveying and mapping when detecting that a UAV is flying off course; and the operator can make the UAV precisely fly along a desired straight line by means of simple operations, thereby simplifying an operation process and promoting the adaptability to changes of the UAV.

DETAILED DESCRIPTION

In order to make the above objects, features and advantages of the present disclosure become more apparent and understood, the present disclosure is further described in detail below with reference to the drawings and specific implementation manners.

Figure 1:
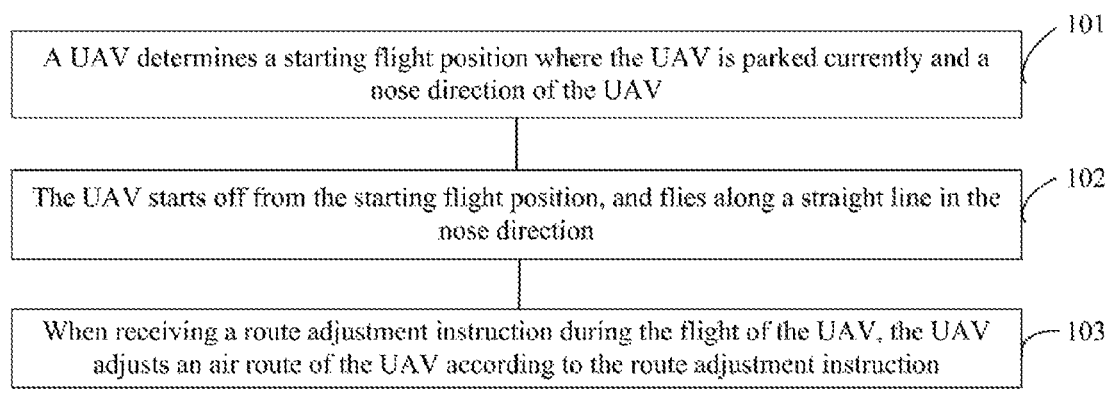
FIG. 1 is a flowchart of a method for controlling the flight of a UAV according to an embodiment of the present disclosure.

As shown in FIG. 1, it shows a flowchart of a method for controlling the flight of a UAV according to an embodiment of the present disclosure. The method may specifically include the steps as follows.

At step 101, a UAV determines a starting flight position where the UAV is parked currently and a nose direction of the UAV.

In a specific implementation, the starting flight position may be a current parking position of the UAV. In the plant protection operation, a position may be pre-defined as the parking position of the UAV, that is, the position where the UAV is parked. If the UAV is not in the pre-defined parking position, the operator can place or control the UAV to fly to the parking position.

In a specific implementation, before the UAV starts off, the starting flight position and the nose direction of the UAV may be detected by a positioning apparatus on the UAV such as a compass instrument and a Global Positioning System (GPS).

In practice, the starting flight position of the UAV may be expressed in latitude and longitude, and the nose direction of the UAV may be represented by a course angle.

In an optional embodiment, before step 101, the method may further include the step that: the UAV receives a flight speed parameter and a flight distance parameter.

Specifically, before an operator performs an operation, the flight speed parameter and the flight distance parameter required for the current operation may be first input through a remote control apparatus.

The flight speed parameter refers to a flight speed at which the UAV is operating.

The flight distance parameter refers to a linear distance, of which the UAV is operating, that the UAV needs to fly.

After receiving the flight speed parameter and the flight distance parameter input by the operator, the remote control apparatus may send the flight speed parameter and the flight distance parameter to the UAV through a communication component.

In a specific implementation, the remote control apparatus may be an apparatus with a touch screen display, or other remote controllers having physical input buttons and other functional physical buttons, which are not limited in the present embodiment of the present disclosure.

At step 102, the UAV starts off from the starting flight position, and flies along a straight line in the nose direction.

When the UAV starts to operate after determining the starting flight position where the UAV is parked currently and the nose direction of the UAV, the UAV may start off from the starting flight position, and fly along the straight line in the nose direction of the UAV.

In an optional embodiment, after the flight speed parameter is determined, step 102 may further include that: the UAV starts off from the starting flight position, and flies along the straight line at a speed specified by the flight speed parameter in the nose direction.

In a specific implementation, when the UAV starts to operate after determining the starting flight position where the UAV is parked currently and the nose direction of the UAV, a flight route determined by the UAV may be: taking the starting flight position as a starting point and a ray emitted from the starting point in the nose direction of the UAV as the flight route.

In practice, after taking the starting flight position as the starting point, the UAV may define a virtual point on the straight line along the nose direction of the UAV as an ending point, and the straight line determined by the starting point and the ending point is taken as the flight route.

Figure 2:
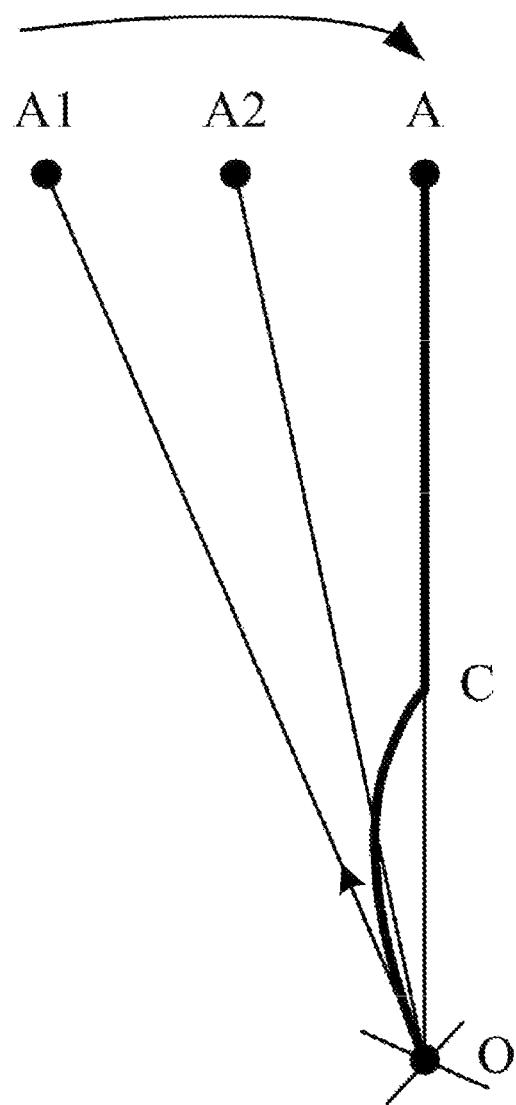
FIG. 2 is a schematic diagram of a flight route of a UAV in a method for controlling the flight of the UAV according to an optional embodiment of the present disclosure.

For example, as shown in the schematic diagram of a flight route of a UAV in FIG. 2, if point O is the starting point, the operator may place to point O or control the UAV to fly to point O, and adjust the nose direction, and if the nose direction is toward point A1, the UAV can take a straight line composed of OA1 as a flight route.

In an exemplary embodiment of the present disclosure, after determining the flight route, the UAV may have the ability to fly along a straight flight route, and when the UAV deviates from the straight flight route, the UAV may return to the straight line as soon as possible, thereby keeping a small deviation.

At step 103, when receiving a route adjustment instruction during the flight of the UAV, the UAV adjusts an air route of the UAV according to the route adjustment instruction.

In a specific implementation, since the nose direction is adjusted by the perception of the operator, manual adjustment of the nose direction is prone to deviation, so that the nose direction cannot be accurately aligned with a direction desired by the operator, resulting in that the flight route determined by the UAV is inconsistent with the flight route actually required by the operator. For example, as shown in FIG. 2, it is assumed that the flight route actually required by the operator is a straight line composed of OA, and when the operator adjusts the nose direction, the nose direction is aligned with point A1, such that the flight route determined by the UAV is a straight line composed of OA1, which deviates from a route OA in which the operator actually needs to fly. In this case, the operator may send a route adjustment instruction to the UAV through the remote control apparatus, and the UAV may automatically adjust the route during the flight of the UAV according to the route adjustment instruction. For example, the route adjustment instruction sent by the operator may be used for notifying the UAV to deviate from point A1 to point A, for example, to point A2, and the UAV may converge toward point A according to the route adjustment instruction after receiving the route adjustment instruction.

In an implementation manner, the remote control apparatus generates the route adjustment instruction in the following manners.

The remote control apparatus may detect an air route adjustment operation performed by an operator in the remote control apparatus. The remote control apparatus may determine at least one of an air route adjustment direction and an air route adjustment margin corresponding to the air route adjustment operation; and generate the route adjustment instruction according to at least one of the air route adjustment direction and the air route adjustment margin.

Specifically, during the flight of the UAV, when the operator observes that the UAV deviates from the air route, the air route adjustment operation may be sent by the remote control apparatus.

In an implementation manner, the air route adjustment operation may include a sliding operation of the operator on a touch screen slider in the remote control apparatus. For example, the touch screen slider may be displayed in a control panel of a control apparatus in the form of a progress bar. When the operator slides the progress bar, it is determined that the operator sends an air route adjustment operation.

Optionally, the touch screen slider may be displayed in a horizontal direction. When the operator slides to the left, it is indicated that the operator wants to control the UAV to shift to the left. When the operator slides to the right, it is indicated that the operator wants to control the UAV to shift to the right.

Optionally, the touch screen slider may be divided into multiple small cells, each small cell is preset to correspond to an offset amplitude of the UAV, and the offset amplitude of the UAV may be determined according to the number of small cells slided by the operator on the touch screen slider, which is the distance where the UAV deviates from the current location.

In another implementation manner, the air route adjustment operation may include a clicking operation of the operator on a physical direction button in the remote control apparatus.

Specifically, the operator may also trigger the air route adjustment operation through the physical direction button in the remote control apparatus. For example, in the remote control apparatus, there may be physical direction buttons in four directions of up, down, left, and right. When the operator clicks on the physical button in the left direction, it is indicated that the operator wants to control the UAV to shift to the left. When the operator clicks on the physical button in the right direction, it is indicated that the operator wants to control the UAV to shift to the right.

Optionally, a click may also be preset to correspond to an offset amplitude of the UAV, and the offset amplitude of the UAV may be determined according to the number of clicks in the same direction by the operator in the remote control apparatus, which is the distance where the UAV deviates from the current location.

In another implementation manner, the air route adjustment operation may also include a touch operation of the operator on a touch screen direction button in the remote control apparatus, that is, physical direction buttons of up, down, left, and right directions in the previous embodiment may be displayed in a virtual button manner in a control interface of the remote control apparatus. When the operator clicks on the virtual button in the left direction, it is indicated that the operator wants to control the UAV to shift to the left. When the operator clicks on the virtual button in the right direction, it is indicated that the operator wants to control the UAV to shift to the right.

Optionally, a click may also be preset to correspond to an offset amplitude of the UAV, and the offset amplitude of the UAV may be determined according to the number of clicks in the same direction by the operator in the remote control apparatus, which is the distance where the UAV deviates from the current location.

In another implementation manner, the air route adjustment operation may also include a moving operation of the operator on a control rocker in the remote control apparatus. When the operator moves the control rocker to the left, it is indicated that the operator wants to control the UAV to shift to the left. When the operator moves the control rocker to the right, it is indicated that the operator wants to control the UAV to shift to the right.

Optionally, a rocker moving operation may also be preset to correspond to an offset amplitude of the UAV, and the offset amplitude of the UAV may be determined according to the number of movements in the same direction by the operator in the remote control apparatus, which is the distance where the UAV deviates from the current location.

It is to be noted that the embodiments of the present disclosure are not limited to the above-mentioned air route adjustment operation, and those skilled in the art may perform other operations to achieve the aim of direction control, which is not limited by the embodiment of the present disclosure.

When the remote control apparatus detects the air route adjustment operation performed by the operator in the remote control apparatus, at least one of the air route adjustment direction and the air route adjustment margin may be determined according to the movement direction and the movement distance of the operator for the touch screen slider, or the direction of the physical direction button or the virtual direction button and the number of clicks, or the movement direction and the number of movements for the rocker.

For example, if a user clicks on the physical button once in the left direction in the remote control apparatus, assuming that the offset amplitude corresponding to one click is 5 meters, the movement direction corresponding to the air route adjustment operation may be obtained as the left direction, and the air route adjustment margin is 5 meters.

After the remote control apparatus determines at least one of the air route adjustment direction and the air route adjustment margin adjusted by the UAV, the air route adjustment instruction may be generated according to at least one of the air route adjustment direction and the air route adjustment margin, and the air route adjustment instruction is sent to the UAV through the communication component, so the UAV may adjust the air route according to at least one of the air route adjustment direction and the air route adjustment margin.

In an implementation manner, the remote control apparatus may generate the route adjustment instruction according to the air route adjustment direction, so after receiving the route adjustment instruction, the UAV offsets by a preset amplitude toward the air route adjustment direction.

In another implementation manner, the remote control apparatus may generate the route adjustment instruction according to the air route adjustment direction and the air route adjustment amplitude, so after receiving the route adjustment instruction, the UAV offsets by a distance corresponding to the air route adjustment amplitude toward the air route adjustment direction. In practice, during the operation of the UAV, when the operator finds that the UAV deviates from the air route, the UAV may be corrected to the correct air route after multiple corrections. For example, as shown in FIG. 2, the air route required by the user to operate the UAV is a straight line OA, but due to the operation error, the operator aligns the nose of the UAV with a direction A1, so the flight route determined by the UAV is a straight line OA1, and the UAV flies along the straight line OA1. At this time, the operator finds that the UAV does not fly in the direction OA, and determines that it is a deviation route. The operator may send the route adjustment instruction to the UAV by the remote control apparatus to indicate shift to the right, for example, shift to point A2. The UAV moves to the position A2 after receiving the route adjustment instruction, so that the UAV flies in a straight line toward the direction O-A2, and the operator continuously corrects the air route according to the above method. When the UAV shifts to point C in FIG. 2, the UAV starts to fly in the direction C-A. Through the above correction, in FIG. 2, the thickened portion is the flight path of the current operation of the UAV.

In an optional embodiment, step 103 may include the sub-steps as follows.

At sub-step S11, when receiving the route adjustment instruction during the flight of the UAV, the UAV flies to a reference point according to the air route adjustment direction and the air route adjustment margin.

Specifically, during the flight of the UAV, after the UAV receives the route adjustment instruction sent by the remote control apparatus, the UAV may be driven to the reference point namely point C as shown in FIG. 2 according to the air route adjustment direction and the air route adjustment margin carried in the route adjustment instruction, or according to an air route adjustment direction carried in the route adjustment instruction and a preset air route adjustment margin.

For example, after the operator operates the control rocker to make the UAV fly to point C in the FIG. 2, the operator will loosen the rocker, and the UAV may take point C as the reference point.

At sub-step S12, the UAV acquires coordinates of the reference point.

After the reference point is determined, the UAV may acquire coordinates of the reference point such as coordinates of point C in FIG. 2 by the positioning apparatus in the UAV.

At sub-step S13, the UAV determines coordinates of a target point according to a direction angle and the flight distance parameter, and the direction angle is determined by the starting flight position and the coordinates of the reference point.

After the UAV determines the coordinates of the reference point, the UAV may determine a direction angle between the starting flight position and the reference point according to the coordinates of the starting flight position and the coordinates of the reference point. And the UAV may calculate coordinates of a target point according to the coordinates of the starting flight position, the direction angle and the flight distance parameter.

For example, as shown in FIG. 2, a direction angle of OC may be determined according to point O and point C, and then coordinates of point A may be obtained according to the direction angle of OC, coordinates of point O and the flight distance parameter.

At sub-step S14, the UAV acquires a real-time course angle of the UAV.

In a specific implementation, the UAV may acquire a real-time course angle of the UAV by a compass of the UAV.

At sub-step S15, the UAV calculates an air route deviation according to the direction angle and the course angle.

After acquiring the course angle and the direction angle, the UAV may calculate a difference between the course angle and the direction angle to take the difference as the air route deviation.

At sub-step S16, the UAV is controlled to align with the target point according to the air route deviation.

After acquiring the air route deviation, the UAV may add the real-time course angle to the air route deviation to obtain an actual flight route angle. Then, the UAV may adjust the nose direction of the UAV to align with the actual flight route angle, so that the UAV is aligned with the target point.

At sub-step S17, the UAV calculates a distance between the reference point and the target point, and the UAV is controlled to fly to the target point.

After the UAV is aligned with the target point, the UAV may calculate the distance between the reference point and the target point to obtain a remaining distance of the current flight route, and then the UAV may be controlled to fly for the remaining distance at a speed specified by the flight speed parameter.

For example, as shown in FIG. 2, after the nose of the UAV is aligned with point A, the UAV may obtain a distance from point C to point A and the UAV is controlled to fly for this distance, so when reaching point A, the UAV completes the current route operation.

In another optional embodiment, step 103 may include the sub-steps as follows.

At sub-step S21, when receiving the route adjustment instruction during the flight of the UAV, the UAV flies to the reference point according to the air route adjustment direction and the air route adjustment margin.

At sub-step S22, the UAV may acquire coordinates of the reference point.

At sub-step S23, the UAV may acquire a real-time course angle of the UAV.

At sub-step S24, the UAV may calculate an air route deviation according to the direction angle and the course angle.

At sub-step S25, the UAV is controlled to align with a direction indicated by the direction angle according to the air route deviation.

At sub-step S26, the UAV may calculate a distance between the starting flight position and the reference point.

At sub-step S27, the flight of the UAV is controlled according to a remaining distance determined by the flight distance parameter and the distance between the starting flight position and the reference point.

The embodiment of sub-step S21 to sub-step S27 is different from the embodiment of sub-step S11 to sub-step S17 described above, except that the present embodiment does not accurately obtain the coordinates of the target point. When the UAV calculates the air route deviation, the UAV may determine the air route deviation according to the difference between the direction angle and the course angle. After the UAV acquires the air route deviation, the UAV may add the course angle to the air route deviation to obtain the actual flight route angle. Then, the UAV may adjust the nose direction of the UAV to align with the actual flight route angle. The actual flight route angle is a vector direction determined by the starting flight position and the coordinates of the reference point. When calculating the remaining distance, the UAV may firstly calculate the flight distance between the starting flight position and the reference point, and secondly calculate the remaining distance according to the flight distance parameter and the flight distance, and then the UAV may be controlled to fly at a speed specified by the flight speed parameter for the remaining distance.

In at least some embodiments of the present disclosure, when the UAV determines the starting flight position and the nose direction of the UAV, the UAV may directly start from the starting flight position and fly along a straight line in the nose direction. During the flight, if the UAV receives the route adjustment instruction, the air route of the UAV can be adjusted according to the route adjustment instruction. At least some embodiments of the present disclosure make the UAV fly along the straight line required by the operator in combination with manual fine adjustment modification and automatic navigation of the UAV; during the flight, the operator can correct the air route via the remote control apparatus without surveying and mapping when detecting that the UAV is flying off course; and the operator can make the UAV precisely fly along the desired straight line by means of simple operations, thereby simplifying an operation process and promoting the adaptability to changes of the UAV.

It is to be noted that, for the method embodiments, for the sake of simple description, they are all expressed as a series of action combinations, but those skilled in the art should understand that the embodiments of the present disclosure are not limited by the described action sequence, because certain steps may be performed in other sequences or concurrently in accordance with some embodiments of the present disclosure. In the following, those skilled in the art should also understand that the embodiments described in the specification are all optional embodiments, and the actions involved are not necessarily required in at least some embodiments of the present disclosure.

Figure 3:
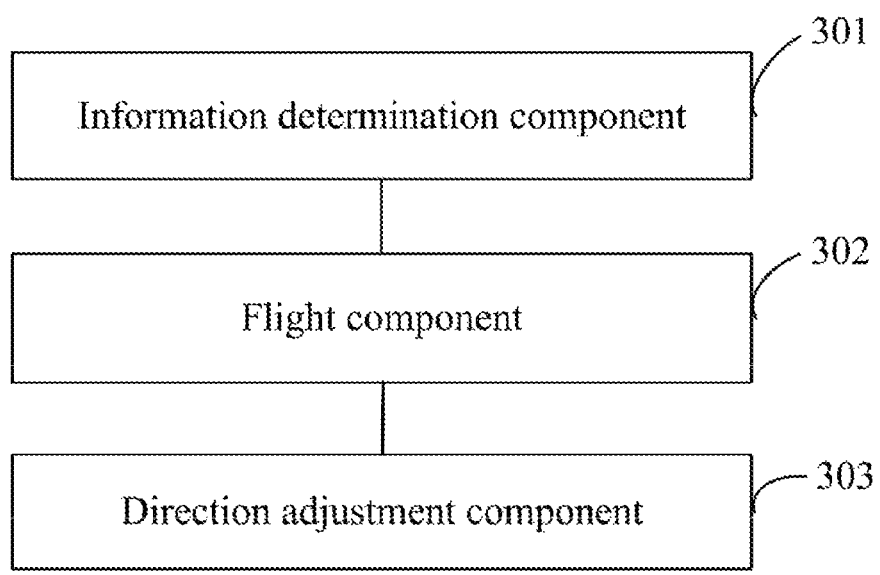
FIG. 3 is a structural block diagram of an apparatus for controlling the flight of a UAV according to an embodiment of the present disclosure.

As shown in FIG. 3, it shows a structural block diagram of an apparatus for controlling the flight of a UAV according to the present disclosure. The apparatus may include: an information determination component 301, a flight component 302 and a direction adjustment component 303.

The information determination component 301 is configured to determine a starting flight position where a UAV is parked currently and a nose direction of the UAV.

The flight component 302 is configured to start off from the starting flight position, and fly along a straight line in the nose direction.

The direction adjustment component 303 is configured to adjust, when receiving a route adjustment instruction during the flight of the UAV, an air route of the UAV according to the route adjustment instruction.

In an optional embodiment, the apparatus further includes a parameter receiving component.

The parameter receiving component is configured to receive a flight speed parameter and a flight distance parameter.

In an optional embodiment, the flight component 302 is further configured to:

start off from the starting flight position, and fly along the straight line at a speed specified by the flight speed parameter in the nose direction.

In an optional embodiment, the route adjustment instruction is an instruction sent by a remote control apparatus, and generating, by the remote control apparatus, the route adjustment instruction in the following manners:

detecting an air route adjustment operation performed by an operator in the remote control apparatus;

determining at least one of an air route adjustment direction and an air route adjustment margin corresponding to the air route adjustment operation; and generating the route adjustment instruction according to at least one of the air route adjustment direction and the air route adjustment margin.

In an optional embodiment, the air route adjustment operation includes at least one of the following operations:

a sliding operation of the operator on a touch screen slider in the remote control apparatus;

a clicking operation of the operator on a physical direction button in the remote control apparatus;

a moving operation of the operator on a control rocker in the remote control apparatus; and a touch operation of the operator on a touch screen direction button in the remote control apparatus.

In an optional embodiment, the direction adjustment component 303 includes: a first reference point flight sub-component, a first reference point coordinate acquisition sub-component, a target point coordinate determination sub-component, a first real-time course angle acquisition sub-component, a first air route deviation calculation sub-component, a first direction alignment sub-component, and a first flight control sub-component.

The first reference point flight sub-component is configured to operate, when receiving the route adjustment instruction during the flight of the UAV, the UAV to fly to a reference point according to the air route adjustment direction and the air route adjustment margin during the flight.

The first reference point coordinate acquisition sub-component is configured to acquire coordinates of the reference point.

The target point coordinate determination sub-component is configured to determine coordinates of a target point according to a direction angle and the flight distance parameter, and the direction angle is determined by the starting flight position and the coordinates of the reference point.

The first real-time course angle acquisition sub-component is configured to acquire a real-time course angle of the UAV.

The first air route deviation calculation sub-component is configured to calculate an air route deviation according to the direction angle and the course angle.

The first direction alignment sub-component is configured to control the UAV to align with the target point according to the air route deviation.

The first flight control sub-component is configured to calculate a distance between the reference point and the target point, and controlling the UAV to fly to the target point.

In another optional embodiment, the direction adjustment component includes: a second reference point flight sub-component, a second reference point coordinate acquisition sub-component, a second real-time course angle acquisition sub-component, a second air route deviation calculation sub-component, a second direction alignment sub-component, a distance calculation sub-component, and a second flight control sub-component.

The second reference point flight sub-component is configured to operate, when receiving the route adjustment instruction during the flight of the UAV, the UAV to fly to a reference point according to the air route adjustment direction and the air route adjustment margin.

The second reference point coordinate acquisition sub-component is configured to acquire coordinates of the reference point.

The second real-time course angle acquisition sub-component is configured to acquire a real-time course angle of the UAV.

The second air route deviation calculation sub-component is configured to calculate an air route deviation according to a direction angle and the course angle, and the direction angle is determined by the starting flight position and the coordinates of the reference point.

The second direction alignment sub-component is configured to control the UAV to align with a direction indicated by the direction angle according to the air route deviation.

The distance calculation sub-component is configured to calculate a distance between the starting flight position and the reference point.

The second flight control sub-component is configured to control the flight of the UAV according to a remaining distance, wherein the remaining distance is determined by the flight distance parameter and the distance between the starting flight position and the reference point.

Various embodiments in the present specification are described in a progressive manner, each embodiment focuses on differences from other embodiments, and the identical or similar parts between the various embodiments can be referred to each other.

A person skilled in the art should understand that at least some embodiments of the present disclosure may be provided as a method, a device or a computer program product. Thus, at least some embodiments of the present disclosure may adopt forms of complete hardware embodiments, complete software embodiments or embodiments integrating software and hardware. Moreover, at least some embodiments of the present disclosure may adopt the form of a computer program product implemented on one or more computer available storage media (including, but not limited to, a disk memory, a CD-ROM, an optical memory and the like) containing computer available program codes.

At least some embodiments of the present disclosure are described with reference to flowcharts and/or block diagrams of the method, the terminal device (system) and the computer program product according to at least some embodiments of the present disclosure. It is to be understood that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing terminal devices to generate a machine, so that an apparatus for achieving functions designated in one or more flows of the flowcharts and/or one or more blocks of the block diagrams is generated via instructions executed by the computers or the processors of the other programmable data processing terminal devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing terminal devices, so that processing implemented by the computers is generated by executing a series of operation steps on the computers or the other programmable terminal devices, and therefore the instructions executed on the computers or the other programmable terminal devices provide a step of achieving the functions designated in one or more flows of the flowcharts and/or one or more blocks of the block diagrams.

While optional embodiments of at least some embodiments of the present disclosure has been described, those skilled in the art can make additional changes and modifications to the embodiments once knowing a basic creativity concept. Therefore, the appended claims are intended to be interpreted as including the optional embodiments and all the changes and modifications falling within the scope of at least some embodiments of the present disclosure.

Finally, it is also to be noted that relational terms such as first and second are used merely to distinguish one entity or operation from another entity or operation herein, and do not necessarily require or imply the existence of any such actual relationship or order between these entities or operations. Moreover, the terms "include", "contain" or any other variations thereof are intended to cover a non-exclusive inclusion, such that a process, method, article or terminal device including a series of elements not only includes those elements, but also includes those elements that are not explicitly listed, or includes elements inherent to such a process, method, article or terminal device. Under the condition of no more limitations, it is not excluded that additional identical elements exist in the process, method, article or terminal device including elements defined by a sentence "including a . . . ".

The above is a detailed description of a method and apparatus for controlling the flight of a UAV provided by the present disclosure. The principle and implementation manner of the present disclosure are described in the specific examples herein. The description of the embodiments is only for helping to understand the method of the present disclosure and its core ideas. Furthermore, for those of ordinary skill in the art, according to the idea of the present disclosure, there will be changes in specific implementation manners and application scopes. In conclusion, the above description should not be taken as limiting the present disclosure.

INDUSTRIAL APPLICABILITY

As described above, at least some embodiments of the present disclosure provide a method for controlling the flight of a UAV and a corresponding apparatus for controlling the flight of the UAV, which have the following beneficial effects: the UAV flies along a straight line required by an operator in combination with manual fine adjustment modification and automatic navigation of the UAV; during the flight, the operator can correct an air route via a remote control apparatus without surveying and mapping when detecting that a UAV is flying off course; and the operator can make the UAV precisely fly along a desired straight line by means of simple operations, thereby simplifying an operation process and promoting the adaptability to changes of the UAV.

What is claimed is:

1. A method for controlling the flight of an Unmanned Aerial Vehicle (UAV), comprising:
   determining a starting flight position where the UAV is parked currently and a nose direction of the UAV;
   taking the starting flight position as a starting point of the UAV, and taking a straight line in the nose direction as an air route of the UAV and controlling the UAV to fly along the air route; and
   when receiving a route adjustment instruction during the flight of the UAV, adjusting the air route of the UAV according to the route adjustment instruction;
   wherein the step of when receiving the route adjustment instruction during the flight of the UAV, adjusting the air route of the UAV according to the route adjustment instruction comprises:
   when receiving the route adjustment instruction during the flight of the UAV, operating the UAV to fly to a reference point according to the air route adjustment direction and the air route adjustment margin; acquiring coordinates of the reference point; determining coordinates of a target point according to a direction angle and the flight distance parameter, wherein the direction angle is determined by the starting flight position and the coordinates of the reference point; acquiring a real-time course angle of the UAV; calculating an air route deviation according to the direction angle and the course angle; controlling the UAV to align with the target point according to the air route deviation; and calculating a distance between the reference point and the target point, and controlling the UAV to fly to the target point.

2. The method as claimed in claim 1, wherein before the step of determining the starting flight position where the UAV is parked currently and the nose direction of the UAV, the method further comprises:
   receiving a flight speed parameter and a flight distance parameter.

3. The method as claimed in claim 2, wherein the step of starting off from the starting flight position and flying along the straight line in the nose direction comprises:
   starting off from the starting flight position, and flying along the straight line at a speed specified by the flight speed parameter in the nose direction.

4. The method as claimed in claim 2, wherein the route adjustment instruction is an instruction sent by a remote control apparatus, and generating, by the remote control apparatus, the route adjustment instruction in the following manners:
- detecting an air route adjustment operation performed by an operator in the remote control apparatus;
- determining at least one of an air route adjustment direction and an air route adjustment margin corresponding to the air route adjustment operation; and
- generating the route adjustment instruction according to at least one of the air route adjustment direction and the air route adjustment margin.

5. The method as claimed in claim 4, wherein the air route adjustment operation comprises at least one of the following operations:
- a sliding operation of the operator on a touch screen slider in the remote control apparatus;
- a clicking operation of the operator on a physical direction button in the remote control apparatus;
- a moving operation of the operator on a control rocker in the remote control apparatus; and
- a touch operation of the operator on a touch screen direction button in the remote control apparatus.

6. The method as claimed in claim 4, wherein the step of when receiving the route adjustment instruction during the flight of the UAV, adjusting the air route of the UAV according to the route adjustment instruction comprises:
- when receiving the route adjustment instruction during the flight of the UAV, operating the UAV to fly to a reference point according to the air route adjustment direction and the air route adjustment margin;
- acquiring coordinates of the reference point;
- acquiring a real-time course angle of the UAV;
- calculating an air route deviation according to a direction angle and the course angle, wherein the direction angle is determined by the starting flight position and the coordinates of the reference point;
- controlling the UAV to align with a direction indicated by the direction angle according to the air route deviation;
- calculating a distance between the starting flight position and the reference point; and
- controlling the flight of the UAV according to a remaining distance, wherein the remaining distance is determined by the flight distance parameter and the distance between the starting flight position and the reference point.

7. An apparatus for controlling the flight of an Unmanned Aerial Vehicle (UAV), comprising:
- an information determination component, configured to determine a starting flight position where the UAV is parked currently and a nose direction of the UAV;
- a flight component, configured to take the starting flight position as a starting point of the UAV, and taking a straight line in the nose direction as an air route of the UAV and control the UAV to fly along the air route; and
- a direction adjustment component, configured to adjust, when receiving a route adjustment instruction during the flight of the UAV, the air route of the UAV according to the route adjustment instruction;
- wherein the direction adjustment component comprises:
  - a first reference point flight sub-component, configured to operate, when receiving the route adjustment instruction during the flight of the UAV, the UAV to fly to a reference point according to the air route adjustment direction and the air route adjustment margin; a first reference point coordinate acquisition sub-component, configured to acquire coordinates of the reference point a target point; coordinate determination sub-component, configured to determine coordinates of a target point according to a direction angle and the flight distance parameter, wherein the direction angle is determined by the starting flight position and the coordinates of the reference point; a first real-time course angle acquisition sub-component, configured to acquire a real-time course angle of the UAV; a first air route deviation calculation sub-component, configured to calculate an air route deviation according to the direction angle and the course angle; a first direction alignment sub-component, configured to control the UAV to align with the target point according to the air route deviation; and a first flight control sub-component, configured to calculate a distance between the reference point and the target point, and controlling the UAV to fly to the target point.

8. The apparatus as claimed in claim 7, further comprising:
- a parameter receiving component, configured to receive a flight speed parameter and a flight distance parameter.

9. The apparatus as claimed in claim 8, wherein the flight component is further configured to:
- start off from the starting flight position, and fly along the straight line at a speed specified by the flight speed parameter in the nose direction.

10. The apparatus as claimed in claim 8, wherein the route adjustment instruction is an instruction sent by a remote control apparatus, and generating, by the remote control apparatus, the route adjustment instruction in the following manners:
- detecting an air route adjustment operation performed by an operator in the remote control apparatus;
- determining at least one of an air route adjustment direction and an air route adjustment margin corresponding to the air route adjustment operation; and
- generating the route adjustment instruction according to at least one of the air route adjustment direction and the air route adjustment margin.

11. The apparatus as claimed in claim 10, wherein the air route adjustment operation comprises at least one of the following operations:
- a sliding operation of the operator on a touch screen slider in the remote control apparatus;
- a clicking operation of the operator on a physical direction button in the remote control apparatus;
- a moving operation of the operator on a control rocker in the remote control apparatus; and
- a touch operation of the operator on a touch screen direction button in the remote control apparatus.

12. The apparatus according to claim 10, wherein the direction adjustment component comprises:
- a second reference point flight sub-component, configured to operate, when receiving the route adjustment instruction during the flight of the UAV, the UAV to fly to a reference point according to the air route adjustment direction and the air route adjustment margin;
- a second reference point coordinate acquisition sub-component, configured to acquire coordinates of the reference point;
- a second real-time course angle acquisition sub-component, configured to acquire a real-time course angle of the UAV;
- a second air route deviation calculation sub-component, configured to calculate an air route deviation according to a direction angle and the course angle, wherein the direction angle is determined by the starting flight position and the coordinates of the reference point;

a second direction alignment sub-component, configured to control the UAV to align with a direction indicated by the direction angle according to the air route deviation;

a distance calculation sub-component, configured to calculate a distance between the starting flight position and the reference point; and a second flight control sub-component, configured to control the flight of the UAV according to a remaining distance, wherein the remaining distance is determined by the flight distance parameter and the distance between the starting flight position and the reference point.

* * * * *